(12) United States Patent
French

(10) Patent No.: US 6,322,121 B1
(45) Date of Patent: Nov. 27, 2001

(54) WHEEL ASSEMBLY WITH A DERAIL GUARD FOR RAIL

(76) Inventor: Charles L. French, 585 Nichols Hill Rd., West Hills, KY (US) 40177

(*) Notice: Subject to any disclaimer, the term of this patent is extended or adjusted under 35 U.S.C. 154(b) by 0 days.

(21) Appl. No.: 09/645,937

(22) Filed: Aug. 25, 2000

(51) Int. Cl.⁷ ................................................. B60B 17/00
(52) U.S. Cl. ............................................. 295/9.1; 104/242
(58) Field of Search ................................ 295/1, 9.1, 9.2, 295/31.1; 104/242, 244, 246, 248

(56) References Cited

U.S. PATENT DOCUMENTS

| 12,371 | * | 2/1855 | Ketcham ................................ 293/30 |
| 245,389 | | 8/1881 | Myers . |
| 310,356 | | 1/1885 | Alcoke . |
| 734,061 | * | 7/1903 | Hansler ................................ 104/242 |
| 861,512 | | 7/1907 | Greene . |
| 938,490 | * | 11/1909 | Kintner ................................ 105/30 |
| 943,665 | | 12/1909 | Edwards . |
| 953,781 | | 4/1910 | Edwards . |
| 1,072,261 | | 9/1913 | Riddle . |
| 1,178,224 | | 4/1916 | Fitz Gibbon . |
| 1,252,998 | | 1/1918 | Castanho . |
| 1,289,653 | | 12/1918 | Castano . |
| 1,422,021 | | 7/1922 | Zeis . |
| 2,319,466 | | 5/1943 | McCormick et al. . |
| 2,800,861 | | 7/1957 | Michalski . |
| 3,645,211 | * | 2/1972 | Gretzschel et al. ................ 105/72.2 |
| 4,305,336 | | 12/1981 | Hunsberger et al. . |

* cited by examiner

Primary Examiner—S. Joseph Morano
Assistant Examiner—Ajay Vasudeva
(74) Attorney, Agent, or Firm—Pillsbury Winthrop LLP

(57) ABSTRACT

A wheel assembly for a rail vehicle that travels on a rail; the wheel assembly comprising a wheel axle, a wheel and a derail guard. The wheel is mounted for rotation about an axis defined by the wheel axle. The wheel has an annular flange on one side thereof, which is adjacent one side of the rail. The derail guard includes a connecting portion, mounted for pivotal movement about the axis of the wheel axle, and a guard portion, depending and hanging pendulously from the connecting portion. The guard portion is disposed on a side of the rail opposite the one side and extends downwardly under the force of gravity. The guard portion is pivotally movable in a direction generally parallel to the rail when contacted by an obstacle adjacent the opposite side of the rail.

6 Claims, 4 Drawing Sheets

WHEEL ASSEMBLY WITH A DERAIL GUARD FOR RAIL

FIELD OF THE INVENTION

The invention relates in general to wheel assemblies for rail vehicles and, more particularly, to a wheel assembly with a derail guard.

BACKGROUND OF THE INVENTION

Rail vehicles generally travel on a track comprising a pair of spaced parallel rails. Wheel assemblies for rail vehicles typically include single flange rail wheels, which have an annular surface that rides on an upper surface of an associated rail. An annular flange on one side of each single flange rail wheel engages an associated inner side of the respective rail. Rail vehicles usually utilize single flange rail wheels in oppositely facing pairs, wherein the respective wheels are opposed across the width of the track. This configuration serves to guide the rail vehicle along the track and provide lateral retainment for the vehicle.

It is generally known that track switches are used to allow a rail vehicle to transfer from one track to another. Additionally, track frogs allow a rail vehicle traveling on one track to cross an intersecting track, without the need of a switch. Smaller rail vehicles, such as production or maintenance vehicles are more prone to derailment at track switches and frog areas of tracks in comparison to other areas of the track.

SUMMARY OF THE INVENTION

The present invention prevents smaller rail vehicles traveling on a rail from derailing by providing a wheel assembly with a derail guard. Additionally, the wheel assembly comprises a wheel axle, which defines an axis, and a wheel. The wheel is mounted for rotation about the axis of the wheel axle and has an annular flange on one side that is adjacent the rail. The derail guard includes a connecting portion that is mounted for pivotal movement about the axis of the wheel axle and a guard portion. The guard portion depends from and hangs pendulously from the connecting portion. Furthermore, the guard portion is disposed on a side of the rail opposite the one side and extends downwardly under the force of gravity. The guard portion is pivotally movable in a direction generally parallel to the rail, when the guard portion is contacted by an obstacle adjacent the opposite side of the rail.

DETAILED DESCRIPTION OF THE INVENTION

Figure 1:
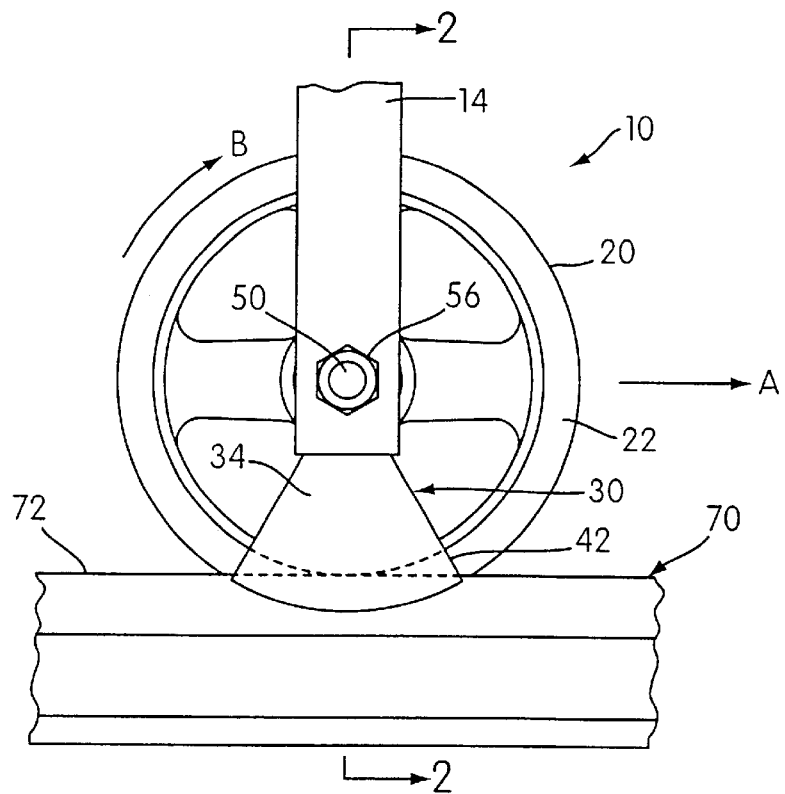
FIG. 1 is a side elevational view of the wheel assembly of the present invention showing the derail guard in a downwardly extending position.
Figure 2:
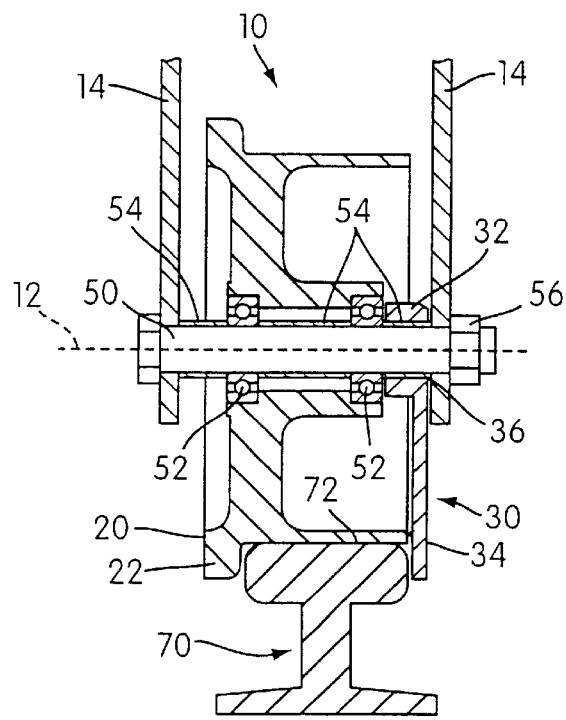
FIG. 2 is a cross-sectional view of the wheel assembly shown in FIG. 1 taken along the line 2—2 in FIG. 1.

FIGS. 1 and 2 show a wheel assembly 10, embodying the principles of the present invention. The wheel assembly 10 includes a single flange rail wheel 20 and a derail guard 30. The single flange rail wheel 20 is positioned on a wheel axle 50 for rotation about an axis 12. The wheel 20 has an annular flange 22 positioned on one side thereof and extends downwardly on one side of a rail 70. Derail guard 30 includes a connecting portion 32, which is mounted on axle 50 for pivotal movement about axis 12. The derail guard 30 also includes a guard portion 34 that depends and hangs pendulously from the connecting portion 32. The guard portion 34 is disposed on a side of rail 70 opposite the side on which flange 22 is positioned.

Shown in FIG. 2, a pair of wheel supports 14 extend generally downwardly from the associated vehicle (not shown). Wheel axle 50 extends between and through wheel supports 14. Wheel axle 50 is formed from a metal, preferably steel, and may be in the form of a partially threaded rod, as shown in FIG. 2, or a bolt. Single flange rail wheel 20 has a plurality of bearings 52, which are mounted to wheel axle 50. The bearings 52 are preferably in the form of roller bearings, more specifically ball bearing, and at least one of the bearings 52 may be an axial thrust bearing. It is contemplated however, that journal bearings or other hydrodynamic bearings may also be utilized. A plurality of axle spacers 54 axially position the bearings 52 such that single flange rail wheel 20 is retained in a predetermined axial position with respect to wheel axle 50. In the case that wheel axle 50 is a partially threaded rod or a bolt, at least one threaded fastener 50 may be threadedly engaged with an associated end of the threaded rod or bolt. It is contemplated that in lieu of axle spacers 54, a variety of elements may be utilized to maintain axial positioning of rail wheel 20, such as c-clips, retaining rings, or machined shoulders on wheel axle 50.

Connecting portion 32 is journaled on an associated axle spacer 54 (which is itself mounted on the axle 50) for pivotal movement about axis 12. Shown in FIGS. 3 and 4, a central opening 36 provided within connecting portion 32 provides a journaling surface which engages an outer periphery of axle spacer 54. A radially extending threaded opening 38 in connecting portion 32 allows a grease fitting 40 to be threadedly engaged therein, by which grease may be directed into the central opening 36 in order to lubricate the journaling surface and outer periphery of axle spacer 54.

Guard portion 34 is preferably formed from a sheet of metal. One end of guard portion 34 is joined to an outer periphery of one axial end of connecting portion 32, preferably by a welding process. It is contemplated that the guard portion and connecting portion may also be integrally formed, such as by machining processes, casting or forging. It is noted that a combination of any of these or other methods may also be used.

Derail guard 30 is pivotally mounted to axle spacer 54 and has a center of gravity (indicated at cg1 in FIG. 3) spaced from pivotal axis 12, described in more detail herein below. As such, derail guard 30 maintains a downwardly hanging position as the vehicle moves along the track (direction indicated by arrow A in FIG. 1) and wheel 20 rotates in a respective direction (indicated by arrow B). Shown in FIG. 2, while in a downwardly hanging position, the guard position 34 is disposed adjacent rail 70. As such, derail guard 30 may serve to laterally retain the wheel 20 on an upper surface 72 of the rail 70 and prevent derailing of the wheel assembly 10 or the associated vehicle (not shown). As shown, both the guard portion 34 and the flange 22 extend below the upper rail surface 72 to retain the rail 70 therebetween.

Figure 5:
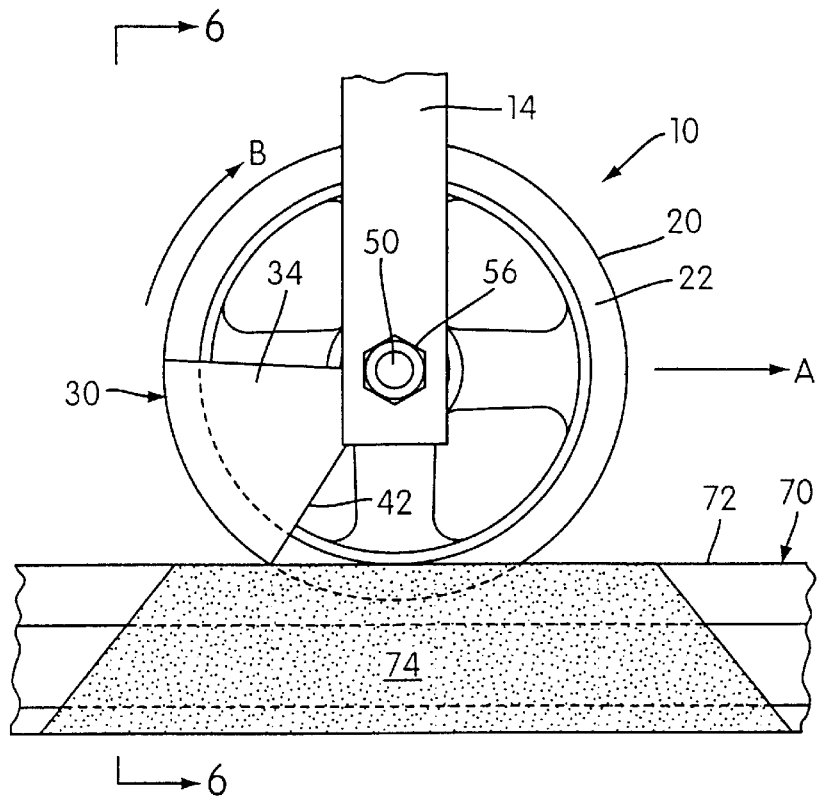
FIG. 5 is a side view of the wheel assembly of the present invention showing the derail guard in a pivoted position.

Certain areas along the track may form obstacles adjacent rail 70. It is noted that track features such as frog sections and switches may present obstacles adjacent rail 70. Additionally, obstacles may be in the form of debris or other objects adjacent rail 70. Shown in FIG. 5, a road crossing 74 is formed by laying asphalt (or concrete, etc.) to a depth approximately equal to the height of the rail 70, such that an upper surface of road crossing 74 is generally coplanar with the upper surface 72 of rail 70. This configuration allows automobiles and the like to cross over the rails without significant jostling. A groove 76 is provided adjacent the side of each rail associated with annular flange 22. Shown in FIG. 6, a groove 76 allows single flange rail wheel 20 to pass through the road crossing 74 without interference from annular flange 22.

Figure 6:
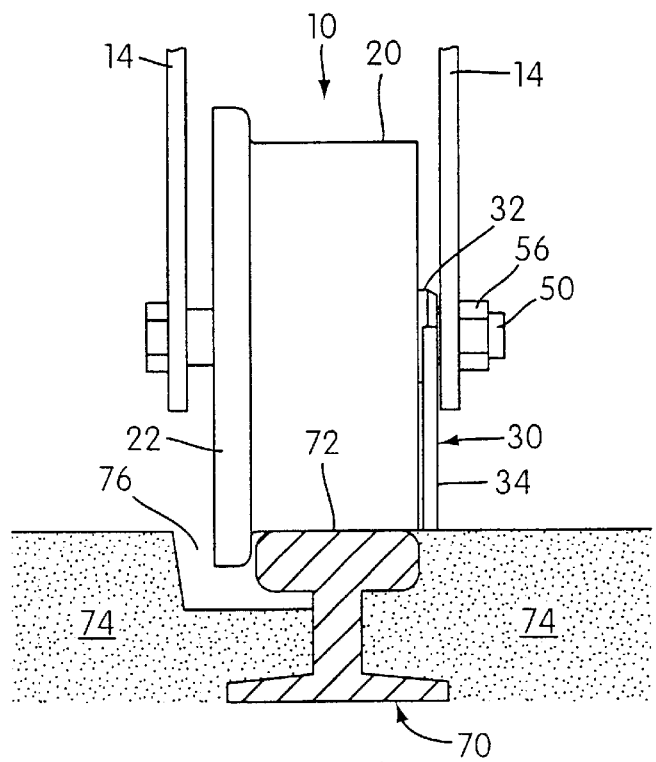
FIG. 6 is a sectional view of the wheel assembly of the present invention taken along line 6—6 in FIG. 5.

When a leading edge 42 of derail guard 30 contacts an obstacle, such as road crossing 74 described above, a pivotal movement is effected which allows derail guard 30 to swing clear of the obstacle. The leading edge 42 then trails along an upper surface of the obstacle, maintaining a pivoted position, as shown in FIG. 6. When leading edge 42 comes out of contact with the obstacle, such as when the wheel assembly 10 passes the obstacle or when the height is insufficient to maintain contact with leading edge 42, the force of gravity effects a pivotal movement of the derail guard 30 back into the downwardly hanging position, wherein guard portion 34 is disposed adjacent rail 70.

As stated herein above, it is preferable for guard portion 34 to possess a low center of gravity. More specifically, it is preferable for guard portion 34 to be configured such that its center of gravity is located as far from axis 12 as possible (with respect to the longitudinal distance of the derail guard 30). Such a configuration ensures that derail guard 30 maintains the generally downwardly hanging position in most circumstances, except for, for example, contact with an obstacle. A low center of gravity additionally aids in the rapid pivotal return of derail guard 30 back into the downwardly hanging position once derail guard 30 comes out of contact with the obstacle.

It can be appreciated that axis 12 is generally perpendicular to the rail 70 direction, and that the guard portion swings about said axis, generally along a plane parallel to the rail 70 direction.

Figure 3:
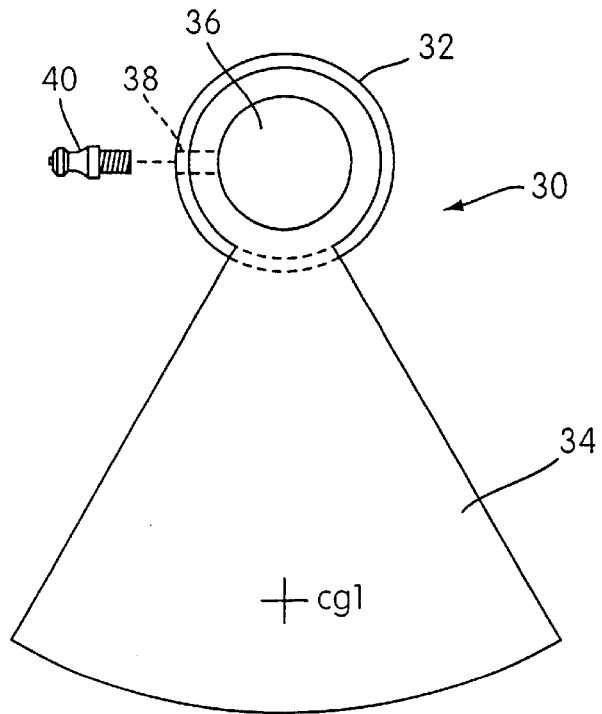
FIG. 3 is a front plan view of a preferred embodiment of the derail guard of the present invention.
Figure 4:
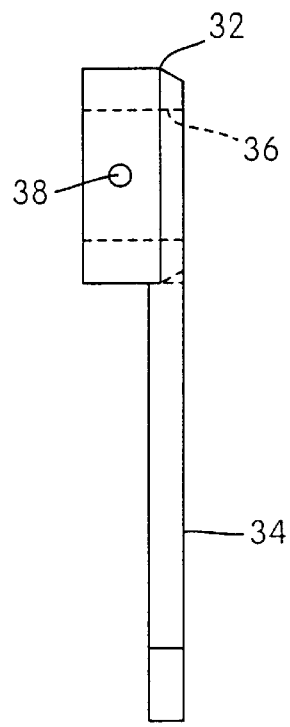
FIG. 4 is a side view of the derail guard shown in FIG. 3.
Figure 7:
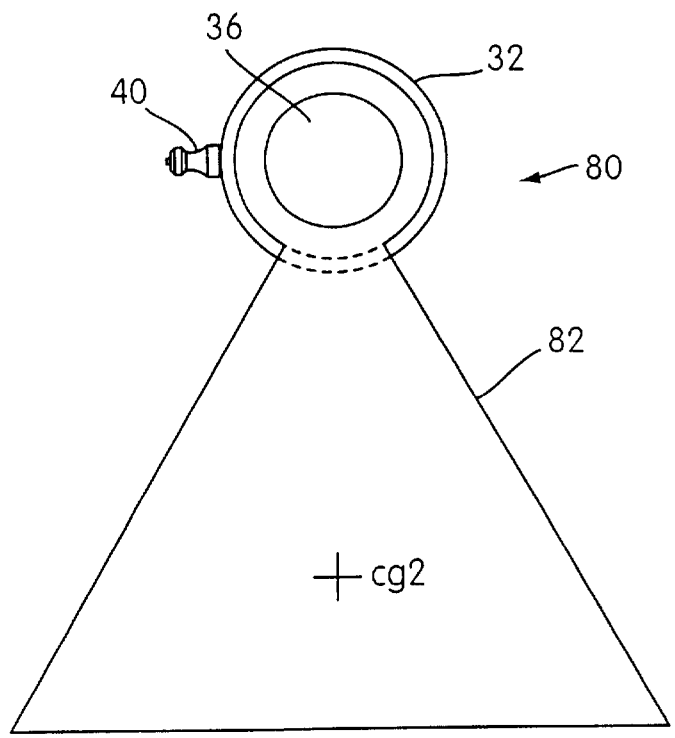
FIGS. 7 and 8 are plan views of alternate embodiments of the derail guard of the present invention.
Figure 8:
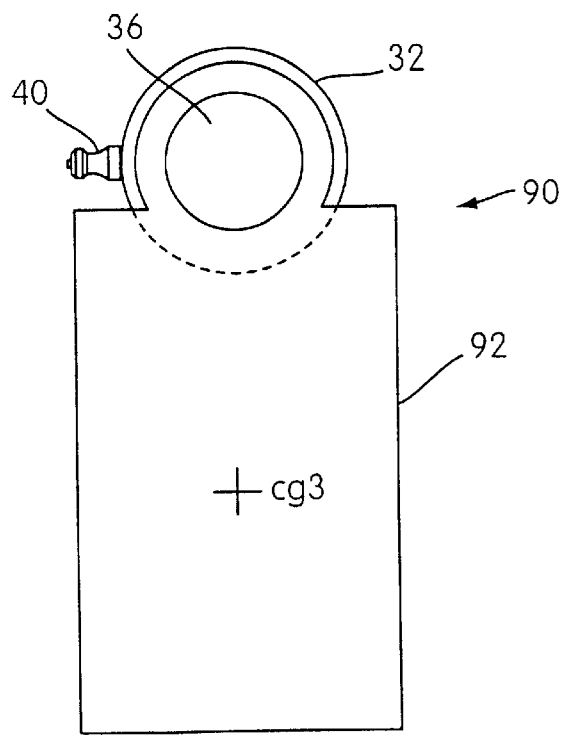

FIGS. 3 and 7 are exemplary of the present invention showing derail guards 30 and 80, respectively. Guard portions 34 and 82 have respective centers of gravity, cg1 and cg2 that are located proximate a lowermost end thereof. FIG. 8 shows an additional embodiment of the derail guard, indicated at 90. Guard portion 92 has a center of gravity, cg3, proximate its center. While embodiments of the derail guard, such as those shown in FIGS. 3 and 7 have an inherent center of gravity that is disposed relatively far from the axis of rotation 12, it is contemplated that any embodiment of the guard portion, including that shown in FIG. 8, that possesses a center of gravity spaced from axis 12 may be utilized.

Furthermore, it is contemplated that the center of gravity of any embodiment of the guard portion may be manipulated (specifically, moved away from the axis of rotation 12) by adding additional weight proximate the lowermost end. For example, a portion of the guard portion proximate the lowermost end may be formed with a greater thickness than the remainder of the guard portion. Alternatively, auxiliary weights may be added proximate the lower end, for example, attachable weights including adhesively-attached and fastened-attached weights. Additional weight may also be added by build-up welding, wherein material is fused to the surface of guard portion 34 proximate the lowermost end.

While the principles of the present invention have been made clear in the illustrative embodiments set forth above, it will be apparent to those skilled in the art that various modifications may be made to the structure, arrangement, proportion, elements, materials, and components used in the practice of the invention. This invention includes all modifications encompassed within the spirit and scope of the following claims.

What is claimed:

1. A wheel assembly for a rail vehicle that travels on a rail, said wheel assembly comprising:

a wheel axle defining an axis;

a wheel mounted for rotation about said axis of said wheel axle, said wheel having an annular flange on one side thereof, said annular flange being adjacent one side of said rail;

a derail guard including a connecting portion mounted for pivotal movement about said axis of said wheel axle, and a guard portion depending and hanging pendulously from said connecting portion;

said guard portion being disposed on a side of said rail opposite said one side, said guard portion extending downwardly under the force of gravity, and wherein said guard portion is pivotally movable in a direction generally parallel to said rail when contacted by an obstacle adjacent said opposite side of said rail.

2. A wheel assembly as in claim 1, wherein said guard portion pivotally returns to its downwardly extending position under the force of gravity subsequent to contact by said obstacle.

3. A wheel assembly as in claim 2, wherein said guard portion and said connecting portion are two separate pieces welded together.

4. A wheel assembly as in claim 3, wherein said guard portion is wedge-shaped having an upper and a lower edge;

said lower edge being convexly arcuate;

said upper edge being narrower than said lower edge;

said guard portion being connected to said connecting portion at said upper edge.

5. A wheel assembly as in claim 3, wherein said guard portion is triangularly shaped having an upper edge and a lower edge;

said lower edge being substantially straight and parallel to said rail;

said upper edge being narrower than said lower edge;

said guard portion being connected to said connecting portion at said upper edge.

6. A wheel assembly as in claim 3, wherein said guard portion is rectangularly shaped having an upper edge and a lower edge;

said lower edge being substantially straight and parallel to said rail;

said upper edge being substantially straight and equal in length to said lower edge;

said guard portion being connected to said connecting portion at said upper edge.

* * * * *